United States Patent
Sung et al.

(10) Patent No.: US 8,670,166 B2
(45) Date of Patent: Mar. 11, 2014

(54) METHOD OF AUTOMATIC WHITE BALANCE ADJUSTMENT FOR SCANNER

(75) Inventors: Chang-Hsien Sung, New Taipei (TW); Chien-Shen Chien, New Taipei (TW)

(73) Assignee: Foxlink Image Technology Co., Ltd., New Taipei (TW)

(*) Notice: Subject to any disclaimer, the term of this patent is extended or adjusted under 35 U.S.C. 154(b) by 105 days.

(21) Appl. No.: 13/454,714

(22) Filed: Apr. 24, 2012

(65) Prior Publication Data

US 2013/0278978 A1 Oct. 24, 2013

(51) Int. Cl.
*H04N 1/46* (2006.01)
*G06K 1/00* (2006.01)
*H04N 9/73* (2006.01)
*G06K 9/40* (2006.01)
*G06K 9/00* (2006.01)

(52) U.S. Cl.
USPC ............ 358/505; 358/516; 358/1.9; 358/506; 348/223.1; 382/274; 382/167

(58) Field of Classification Search
USPC ............... 358/505, 516, 1.9, 506; 348/223.1; 382/274, 167
See application file for complete search history.

(56) References Cited

U.S. PATENT DOCUMENTS 7,286,703 B2 * 10/2007 Kaku ............................ 382/167
2002/0030837 A1 * 3/2002 Hokoi ............................ 358/1.9

* cited by examiner

*Primary Examiner* — Charlotte M Baker
*Assistant Examiner* — Rury Grisham

(57) ABSTRACT

A method of automatic white balance adjustment for a scanner is described hereinafter. First, a light source provides a white light to make the scanner scan a document and get an initial image of the document. Secondly, red, green and blue chromatic values of a background color are obtained in the initial image. Next, a factor is calculated based on the chromatic values and a calibration value which is stored in a calibration sheet. Lastly, the scanner automatically adjusts a brightness ratio of the red, green and blue lights of the light source according to the factor, and then rescans the document to get a final image which has a processed background color. Therefore, the final image having the background color close to white is in favor of identification. Furthermore, the adjustment is executed in the process of the scanner rescanning the document so that the step of executing adjustment by software can be eliminated.

5 Claims, 2 Drawing Sheets

METHOD OF AUTOMATIC WHITE BALANCE ADJUSTMENT FOR SCANNER

BACKGROUND OF THE INVENTION

1. Field of the Invention

The present invention relates to a white balance adjustment method, and more particularly to a method of automatic white balance adjustment for a scanner.

2. The Related Art

A traditional scanning process of a scanner is to utilize a white light to illuminate a document which is being scanned by the scanner. An image of the document is got by sensing and analyzing a reflected light and then is transmitted to a processing unit of a software, where the white balance adjustment for the background color of the image is executed. However, when the color of the content in the document is close to the background color of the document, it is difficult for the scanner to do the color identification between the content and the background that further results in a difficult white balance adjustment for the image.

SUMMARY OF THE INVENTION

Accordingly, an object of the present invention is to provide a method of automatic white balance adjustment for a scanner. The method is described hereinafter. First, a light source provides a white light to make the scanner scan a document and get an initial image of the document. Secondly, get red, green and blue chromatic values of a background color in the initial image. Next, calculate a factor based on the chromatic values and a calibration value which is stored in a calibration sheet. Lastly, the scanner automatically adjusts a brightness ratio of the red, green and blue lights of the light source according to the factor, and then rescans the document to get a final image which has a processed background color.

As described above, the method of automatic white balance adjustment for the scanner calculates the factor based on the red, green and blue chromatic values of the background color in the initial image and the calibration value which is stored in the calibration sheet, and the scanner can automatically adjust the brightness ratio of the red, green and blue lights of the light source according to the factor, and then rescans the document to get the final image with the background color thereof being close to white. As a result, the final image having the background color close to white is in favor of identification, and furthermore, the adjustment is executed in the process of the scanner rescanning the document so that the step of executing adjustment by software (shown in the prior art) can be eliminated.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
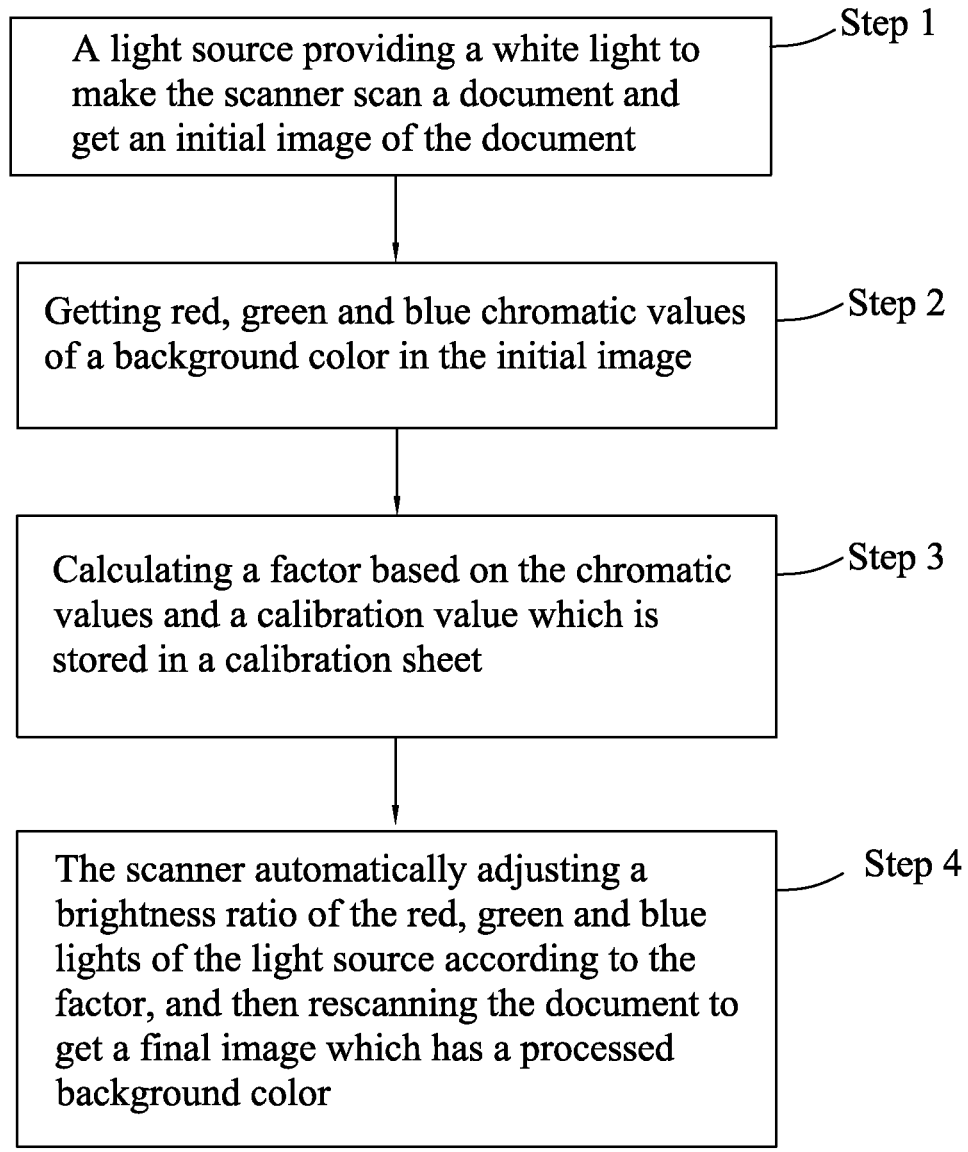
FIG. 1 is a block diagram showing a method of automatic white balance adjustment for a scanner in accordance with the present invention.

Referring to the drawings in greater detail, and first to FIG. 1, a method of automatic white balance adjustment for a scanner is described as follows.

Step 1, a light source provides a white light to make the scanner scan a document and get an initial image of the document.

Step 2, get red, green and blue chromatic values of a background color in the initial image.

Step 3, calculate a factor based on the chromatic values and a calibration value which is stored in a calibration sheet.

Step 4, the scanner automatically adjusts a brightness ratio of the red, green and blue lights of the light source according to the factor, and then rescans the document to get a final image which has a processed background color.

Figure 2:
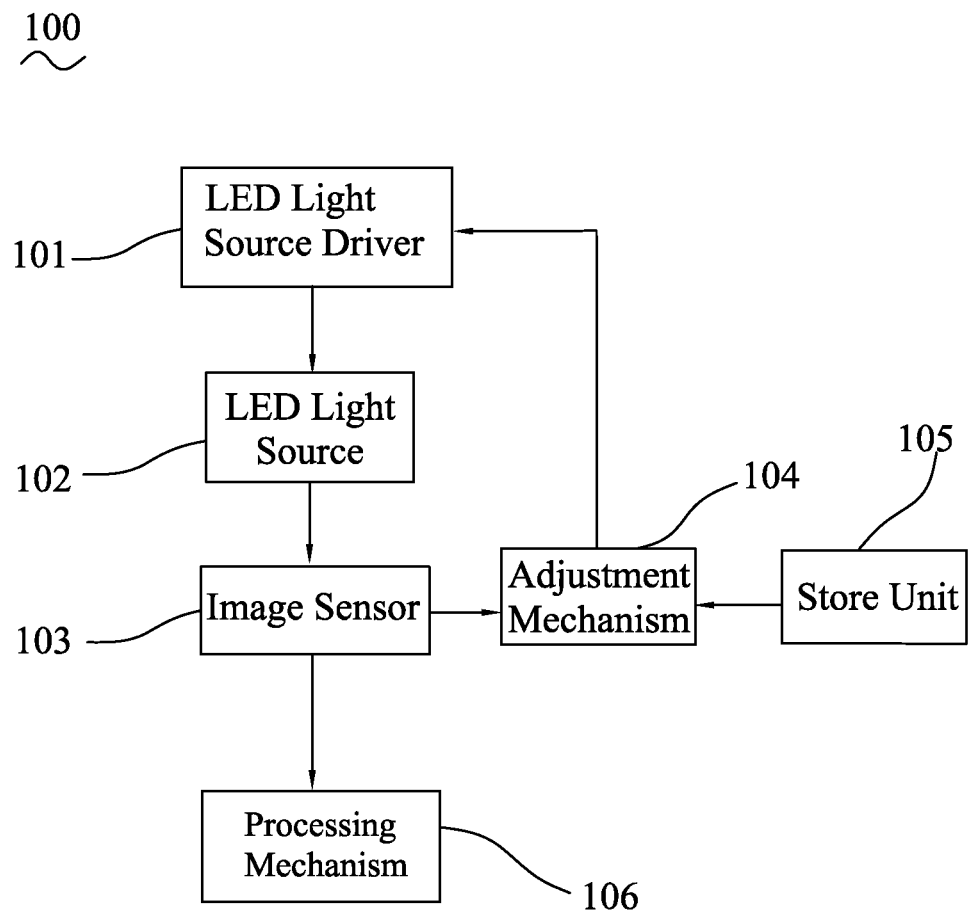
FIG. 2 is a block diagram of an automatic white balance adjustment device using the method shown in FIG. 1.

Referring to FIGS. 1-2, an automatic white balance adjustment device 100 using the above-mentioned method for the scanner includes a LED (Light Emitting Diode) light source driver 101, a LED light source 102, an image sensor 103, an adjustment mechanism 104, a store unit 105 and a processing mechanism 106. The process of the automatic white balance adjustment device 100 executing the above-mentioned method is in detail described as follows.

Firstly, as described in Step 1, the LED light source driver 101 impels the LED light source 102 to provide the white light which has red (R), green (G) and blue (B) lightness ratio of 1:1:1. The image sensor 103 senses the reflected light to get the initial image of which the red, green and blue chromatic values at each pixel are transferred to the adjustment mechanism 104. The red, green and blue chromatic values at each pixel of the initial image are obtained according to a formula (1) shown as follows: DigitalImage_i=WhiteCalibration_i*(SensorValue_i-DarkCalibration_i), where i is any pixel of the initial image, DigitalImage_i is the red, green and blue chromatic values after the initial image get by the image sensor 103 at the pixel i (SensorValue_i) is calculated by the formula (1), WhiteCalibration_i is a white calibration value of the pixel i after being calibrated by the scanner according to the calibration sheet, and the DarkCalibration_i is a dark calibration value of the pixel i after being calibrated by the scanner according to the calibration sheet. The calibration sheet mentioned above is a uniform white calibration sheet and stored in the store unit 105 before the Step 1, so a calibration value named WhiteCalibrationSheetLevel (CSR, CSG, CSB) has constant red, green and blue chromatic values at each pixel that further makes the calibration value constant. As the calibration sheet is uniform white, the ratio of CSR, CSG and CSB is 1:1:1.

If j is any pixel of the background color in the initial image, the red, green and blue chromatic values at each pixel j are named UserBackgroundLevel (UR, UG, UB), namely DigitalImage_j ($DIR_j$, $DIG_j$, $DIB_j$) in this embodiment. Subsequently, as described in Step 2, three formulas (2), (3) and (4) are obtained to get the red, green and blue chromatic values $DIR_j$, $DIG_j$ and $DIB_j$ of the background color at the pixel j, by calculating DigitalImage_j ($DIR_j$, $DIG_j$, SensorValue_j ($SR_j$, $SG_j$, $SB_j$), WhiteCalibration_j ($WR_j$, $WG_j$, $WB_j$) and DarkCalibration_j ($DR_j$, $DG_j$, $DB_j$) according to the formula (1). As a result, the formula (2) is $DIR_j=UR=WR_j*(SR_j-DR_j)$, the formula (3) is $DIG_j=UG=WG_j*(SG_j-DG_j)$, and the formula (4) is $DIB_j=UB=WB_j*(SB_j-DB_j)$.

Thereafter, as described in Step 3, the adjustment mechanism 104 reads the calibration value WhiteCalibrationSheetLevel (CSR, CSG, CSB) from the store unit 105, and then calculates the factor named weighting (wtR, wtG, wtB) through a formula (5), wherein the formula (5) is weighting=WhiteCalibrationSheetLevel/UserBackgroundLevel. Accordingly, three formulas (6), (7) and (8) are obtained according to the formula (5), and they are respectively shown as follows: wtR=CSR/UR, wtG=CSG/UG, wtB=CSB/UB.

Lastly, as described in Step 4, the adjustment mechanism 104 controls the LED light source driver 101 to adjust the brightness ratio of the red, green and blue lights of the LED light source 102 according to the factor weighting (wtR, wtG, wtB), so as to obtain a reflected light of red, green and blue chromatic values of 1:1:1. Then the image sensor 103 gets the final image with the background color being close to white in the process of the scanner rescanning the document. The final image is transferred to the processing mechanism 106 subsequently.

In Step 4, the principle of the background color in the final image being close to white is described hereinafter. The reflected light of the red, green and blue chromatic values of 1:1:1 at the pixel j is obtained through a formula (9) which is NewDigitalImage_j=DigitalImage_j*weighting, wherein NewDigitalImage_j ($NDIR_j$, $NDIG_j$, $NDIB_j$) is namely new red, green and blue chromatic values at the pixel j of the background color in the final image. According to the formulas (2) to (9), the new red, green and blue chromatic values at the pixel j $NDIR_j$, $NDIG_j$ and $NDIB_j$ will be respectively calculated as follows: $NDIR_j$=$DIR_j$*wtR=UR*(CSR/UR)=CSR, $NDIG_j$=$DIG_j$*wtG=UG*(CSG/UG)=CSG, and $NDIB_j$=$DIB_j$*wtB=UB*(CSB/UB)=CSB. So the ratio of $NDIR_j$, $NDIG_j$ and $NDIB_j$ equals to the ratio of CSR, CSG and CSB, that is 1:1:1.

As described above, the method of automatic white balance adjustment for the scanner calculates the factor based on the red, green and blue chromatic values of the background color in the initial image and the calibration value which is stored in the calibration sheet, and the scanner can automatically adjust the brightness ratio of the red, green and blue lights of the light source according to the factor, and then rescans the document to get the final image with the background color thereof being close to white. As a result, the final image having the background color close to white is in favor of identification, and furthermore, the adjustment is executed in the process of the scanner rescanning the document so that the step of executing adjustment by software can be eliminated.

What is claimed is:

1. A method of automatic white balance adjustment for a scanner, comprising:
   using a light source to provide a white light to make the scanner scan a document and get an initial image of the document;
   getting red, green and blue chromatic values of a background color in the initial image;
   calculating a factor based on the chromatic values and a calibration value which is stored in a calibration sheet; and
   automatically adjusting a brightness ratio of the red, green and blue lights of the light source according to the factor, and then rescanning the document to get a final image which has a processed background color;
   wherein the factor is calculated by a formula shown as follows: weighting=WhiteCalibrationSheetLevel/UserBackgroundLevel, where weighting is the factor, WhiteCalibrationSheetLevel is the calibration value in the calibration sheet, and UserBackgroundLevel is the chromatic values can be eliminated of the background color in the initial image.

2. The method as claimed in claim 1, wherein the ratio of the red, green and blue chromatic values of the processed background color in the final image is capable of being 1:1:1 according to a formula: NewDigitalImage_j=DigitalImage_j*weighting, where j is any pixel of the background color in the initial image, DigitalImage_j is the chromatic values at the pixel j of the background color in the initial image, and NewDigitalImage_j is new chromatic values at the pixel j of the processed background color in the final image.

3. The method as claimed in claim 1, wherein the calibration sheet is stored in the scanner before the document is scanned.

4. The method as claimed in claim 1, wherein the calibration sheet is uniform white, and has constant red, green and blue chromatic values of 1:1:1 that makes the calibration value constant.

5. The method as claimed in claim 1, wherein red, green and blue lightness ratio of the white light is 1:1:1.

* * * * *